United States Patent
Yabuki et al.

(10) Patent No.: US 11,016,338 B1
(45) Date of Patent: May 25, 2021

(54) DISPLAY DEVICE WITH LED SUBSTRATE, AND BACKLIGHT UNIT THEREOF

(71) Applicant: Panasonic Liquid Crystal Display Co., Ltd., Himeji (JP)

(72) Inventors: Ryosuke Yabuki, Hyogo (JP); Tomoharu Notoshi, Hyogo (JP); Naoki Sato, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/696,665

(22) Filed: Nov. 26, 2019

(51) Int. Cl.
*G02F 1/13357* (2006.01)
*F21V 8/00* (2006.01)

(52) U.S. Cl.
CPC ..... *G02F 1/133603* (2013.01); *G02B 6/0021* (2013.01); *G02B 6/0073* (2013.01); *G02B 6/0091* (2013.01); *G02F 1/133615* (2013.01)

(58) Field of Classification Search
CPC ........ G02F 1/133603; G02F 1/133615; G02B 6/0091; G02B 6/0021; G02B 6/0073
See application file for complete search history.

(56) References Cited

U.S. PATENT DOCUMENTS

| 8,576,355 B2 | 11/2013 | Hosoki |
| 9,052,430 B2 | 6/2015 | Urano et al. |
| 2013/0135537 A1* | 5/2013 | Kuromizu ......... G02F 1/133603 348/790 |

FOREIGN PATENT DOCUMENTS

| KR | 2013020171 A | * | 2/2013 | |
| WO | WO-2013077243 A1 | * | 5/2013 | ........... G02B 6/0083 |

* cited by examiner

*Primary Examiner* — Jessica M Merlin
(74) *Attorney, Agent, or Firm* — Hamre, Schumann, Mueller & Larson, P.C.

(57) ABSTRACT

A display device includes a liquid crystal display (LCD) panel, a rear frame, a light guide plate, and a light emitting diode (LED) substrate. The LED substrate includes a first substrate portion, a second substrate portion, a plurality of LEDs mounted to the first substrate portion, and a power connector mounted to the second substrate portion. The first substrate portion extends in a first direction along a first side of the light guide plate that faces the first sidewall of the rear frame. The second substrate portion extends in a second direction along a second side of the light guide plate that faces the second sidewall of the rear frame. A backlight unit for a display device includes a light guide plate and a LED substrate.

10 Claims, 5 Drawing Sheets

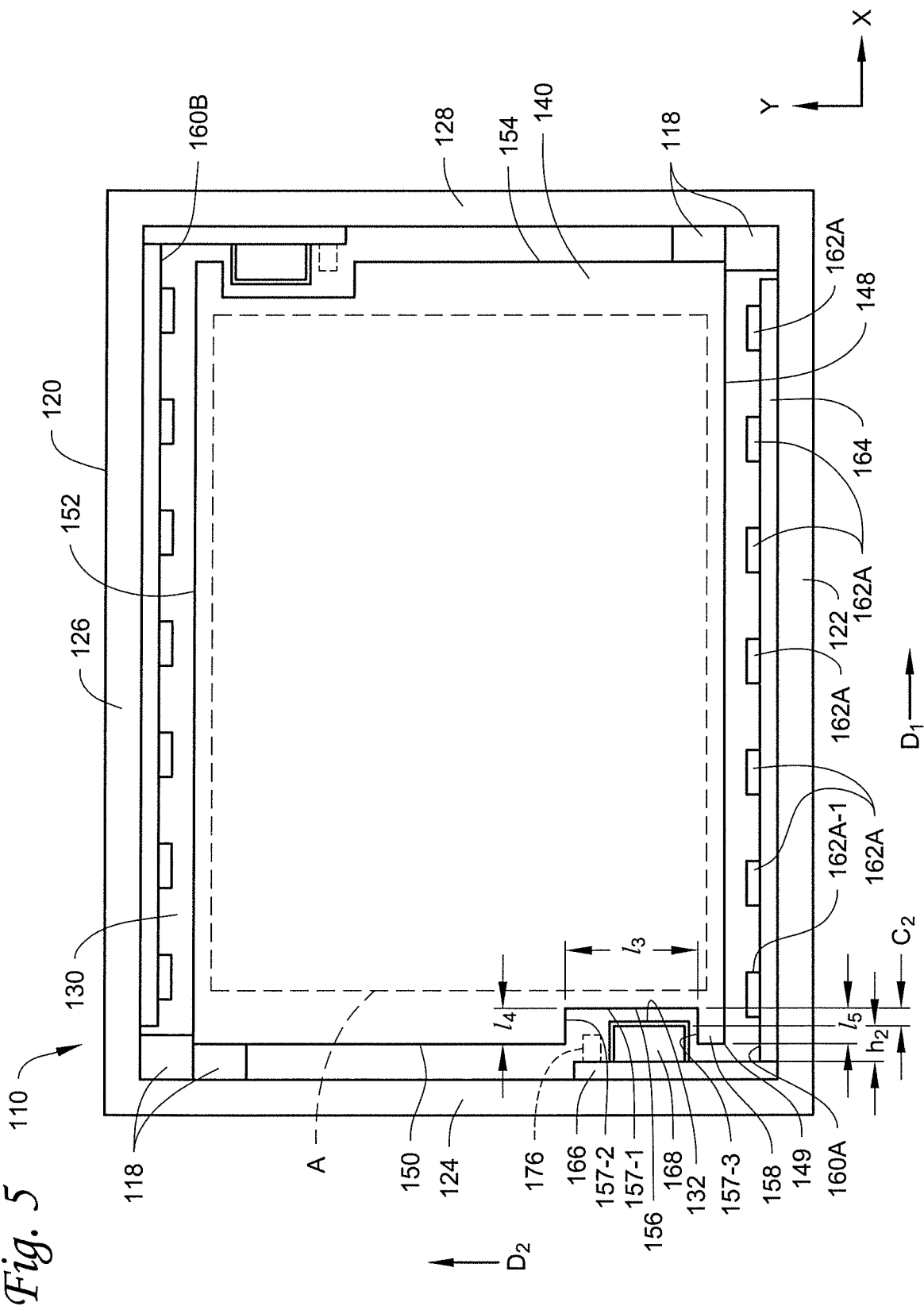

US 11,016,338 B1

DISPLAY DEVICE WITH LED SUBSTRATE, AND BACKLIGHT UNIT THEREOF

FIELD

This disclosure relates to an electronic display devices that display an image. More specifically, this disclosure relates to backlight units in such electronic display devices.

BACKGROUND

An electronic display device displays an image by filtering light. For example, a display device may include a light source and one or more components (e.g., a liquid crystal display ("LCD") panel, diffuser, etc.) configured to filter the light emitted from the light source. The light source can be a backlight unit that supplies light to the one or more components. The backlight unit can be an edge type or direct type backlight unit. In a direct type backlight unit, light emitted from light source element(s) (e.g., LEDs, lamp, etc.) proceeds directly to the one or more components. In an edge type backlight unit, light source element(s) are located along edge(s) of a panel that redirects the light emitted from the light source element(s) towards the one or more components that then filter the light to display the desired image.

SUMMARY

In an embodiment, a display device includes a liquid crystal display (LCD) panel, a rear frame, a light guide plate, and a light emitting diode (LED) substrate. The light emitting diode substrate includes a plurality of LEDs that are configured to supply light to a side of the light guide plate. The light guide plate is configured to redirect light incoming from its side(s) through its front towards the LCD panel.

In an embodiment, the rear frame includes a first sidewall and a second sidewall. The light guide plate includes a first side that faces the first sidewall and a second side that faces the second sidewall. The LED substrate includes a first substrate portion and a second substrate portion. The plurality of LEDs are mounted to the first substrate portion, and the first substrate portion extends in a first direction along the first side of the light guide plate. A power connector is mounted to the second substrate portion and the second substrate extends in a second direction along the second side of the light guide plate.

In an embodiment, the first substrate portion is disposed between the first side of the light guide plate and the first sidewall of the rear frame in plan view. In an embodiment, the second substrate portion is disposed between the second side of the light guide plate and the second sidewall of the rear frame in plan view.

In an embodiment, the light guide plate includes a notch in at least one of the first side and the second side. The power connector is disposed in the notch in plan view. In an embodiment, the notch extends into the second side of the light guide plate and is spaced apart from the first side by a section of the light guide plate in plan view. In an embodiment, the notch extends into both the first side and the second side of the light guide plate in plan view.

In an embodiment, the second substrate portion extends from an end of the first substrate in the second direction.

In an embodiment, the rear frame includes a rear wall with an opening. The light guide plate is disposed between the rear wall and the LCD panel in a thickness direction of the display device. The power connector includes a socket facing in a third direction towards the opening in the rear frame, and/or the power connector extends through the opening in the rear frame in the third direction.

In an embodiment, the display device includes a controller and a cable. The cable is electrically connected to the controller and is plugged into the power connector.

In an embodiment, the LED substrate includes a supplemental LED that is mounted onto the second substrate portion. The power connector is located between the supplemental LED and the first substrate portion in plan view. In an embodiment, the supplemental LED is configured to have luminous flux that is at or about or less than 0.5 of an average luminous flux of the plurality of LEDs.

The plurality of LEDs includes an end LED that is the closest LED to the second substrate portion. In an embodiment, end LED is configured to have a luminous flux that is at or about 1.3 to at or about 2.0 of an average luminous flux of the other LEDs in the plurality of LEDs.

In an embodiment, a backlight unit for a display device includes an LED substrate and a frame. The light emitting diode substrate includes a plurality of LEDs that are configured to supply light to at least a side of the light guide plate. The light guide plate is configured to redirect light incoming from its side(s) through its front.

BRIEF DESCRIPTION OF THE DRAWINGS

Both described and other features, aspects, and advantages of a display device and a backlight unit for a display device will be better understood with the following drawings:

FIG. 5 is a schematic view of an embodiment of a backlight unit in a display device.

Like reference characters refer to similar features.

DETAILED DESCRIPTION

A display device displays an image to a viewer. The display device can include a backlight unit and is configured to filter the light emitted by the backlight unit to display the desired image. The backlight unit can include a light guide plate and a substrate with a plurality of LEDs that are arranged along a side of the light guide plate. Previously, the substrate had a portion along the LEDs that extend away from the light guide plate and included pins and/or a socket that extend downwards from the substrate. This caused the substrate to have a larger height or width and required the display device to have a larger bezel to accommodate the larger area of the substrate.

Embodiments disclosed herein are related to display devices and backlight units for display devices. The backlight unit includes a substrate with a plurality of LEDs and a power connector. The LED substrate is configured so that the power connector does not significantly increase the width/height of the LED substrate and require additional room along the LEDs to accommodate the power connector. The configuration of the LED substrate can advantageously allow the display device to have a smaller bezel.

Figure 1:
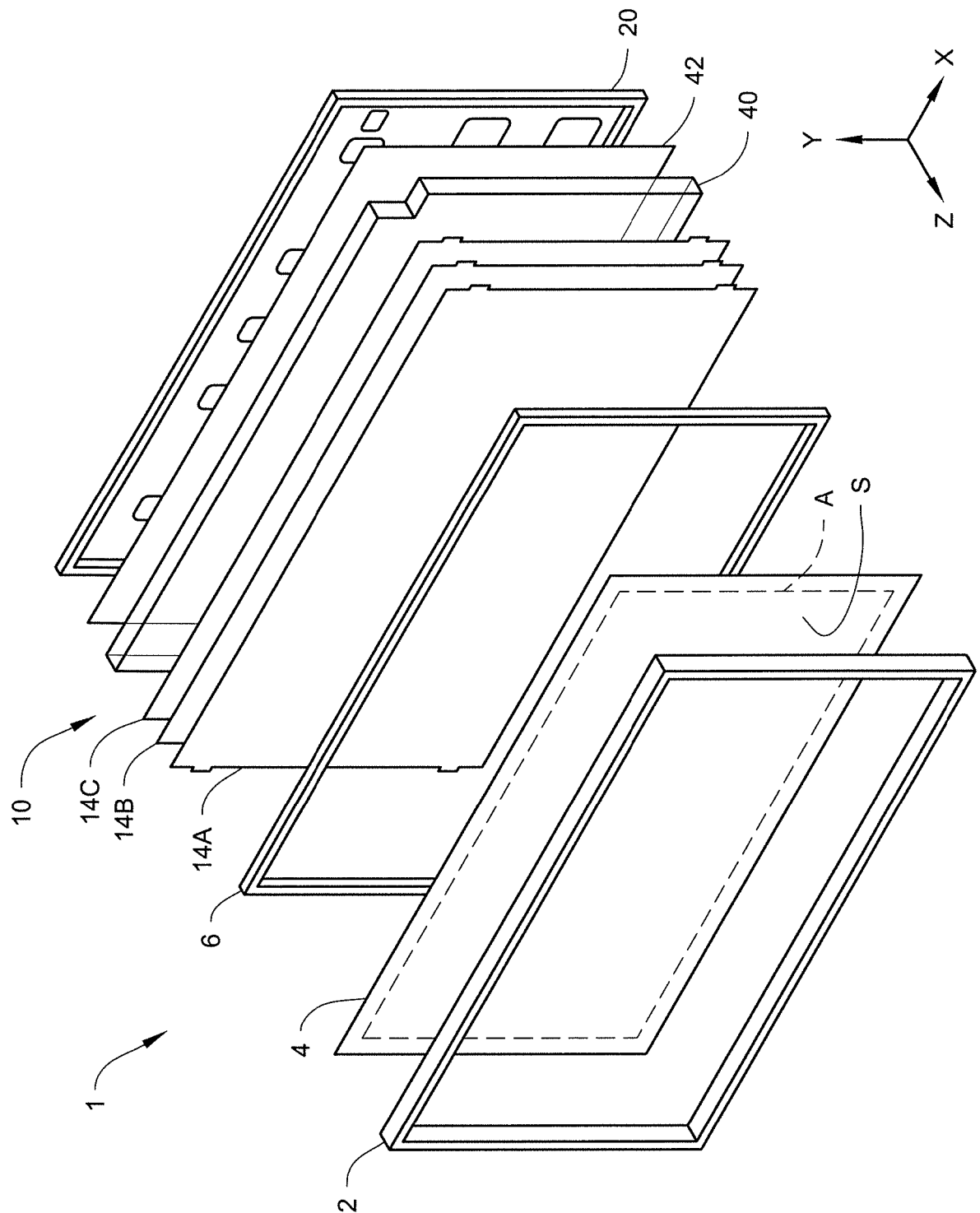
FIG. 1 is an exploded view of an embodiment of a display device.

FIG. 1 is an exploded view of an embodiment of a display device 1. The display device 1 is a liquid crystal displace device. The display device 1 includes a front frame 2, a liquid crystal display (LCD) panel 4, a middle frame 6, and a backlight unit 10. The backlight unit 10 includes a rear frame 20 and a light guide plate 40. The LCD panel 4 has a viewing surface S configured to displays image(s) to a viewer (not shown). The image(s) are displayed in a display area A of the viewing surface S.

The backlight unit 10 is configured to supply light to the LCD panel 4. In an embodiment, the backlight unit 10 includes a reflective sheet 42. The backlight unit 10 is discussed in more detail below. The display device 1 in FIG. 1 includes a single LCD panel 4. However, it should be appreciated that the display device 1 in an embodiment may include two or more stacked LCD panels 4.

In an embodiment, three optical films 14A, 14B, 14C are arranged between the backlight unit 10 and the LCD panel 4. For example, the optical films 14A, 14B, 14C, can be one or more brightness enhancing films or the like. However, the display device 1 in an embodiment may include a different number of optical films 14A, 14B, 14C. In an embodiment, the display device 1 may include one or more of the optical films 14A, 14B, 14C. In an embodiment, the display device 1 may not include any optical films 14A, 14B, 14C.

Figure 2:
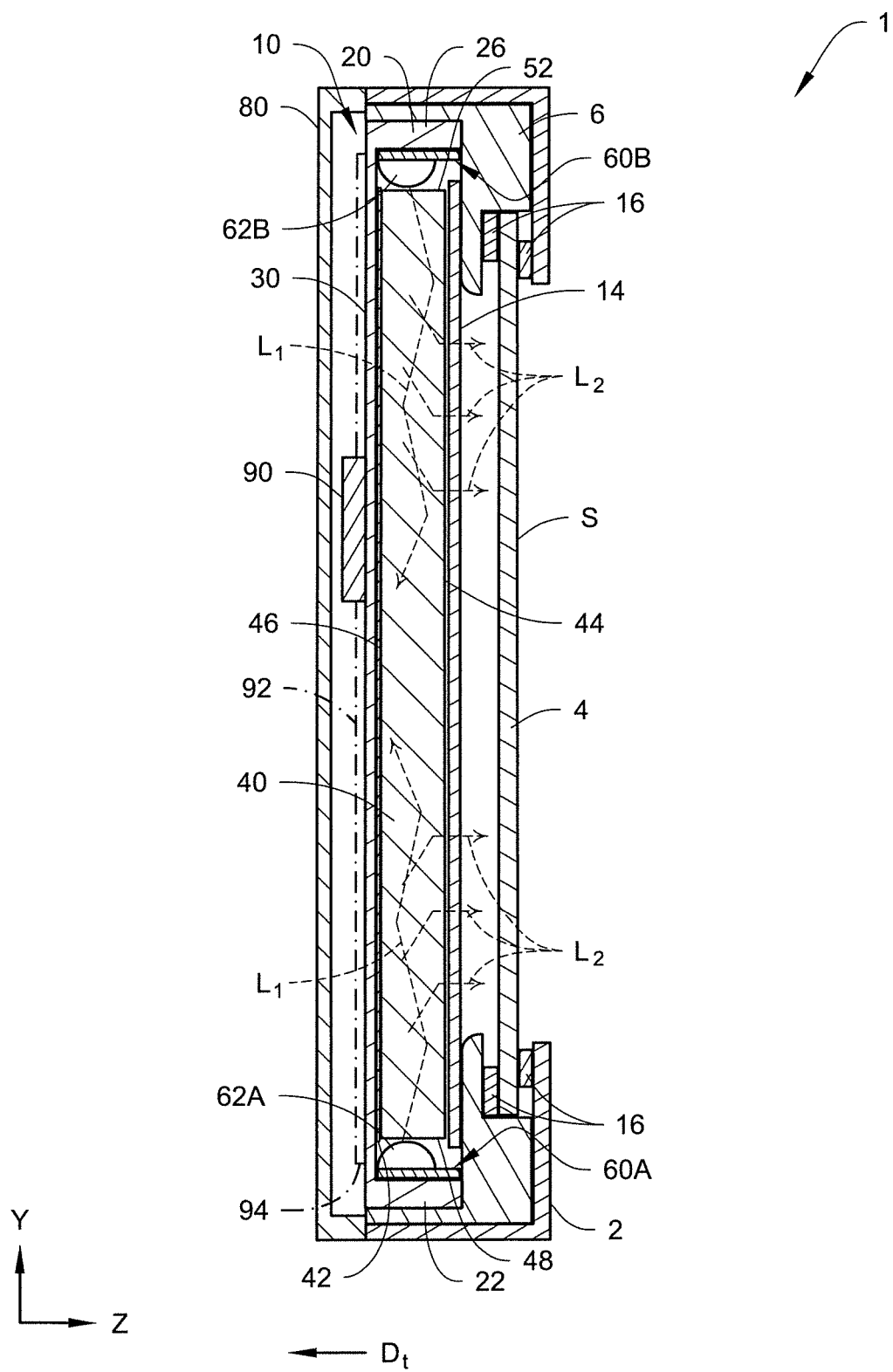
FIG. 2 is a cross-sectional view of the display device in FIG. 1, according to an embodiment.

FIG. 2 is a cross-sectional view of the display device 1, according to an embodiment. The cross-sectional view in FIG. 2 is a cross-section that extends along the Y axis in FIG. 1. In an embodiment, the LCD panel 4 is arranged in the middle frame 6. In an embodiment, the display device 1 can include cushion(s) 16 for positioning the LCD panel 4 between the middle frame 6 and the front frame 2. The optical films 14A, 14B, 14C are represented as a single optical sheet 14 in FIG. 2 for simplicity.

In an embodiment, the rear frame 20 includes sidewalls 22, 26 and a rear wall 30. The light guide plate 40 is located between the rear wall 30 and the LCD panel 4 in a thickness direction $D_t$ of the display device 1. The light guide plate 40 is located in the rear frame 20. For example, the light guide plate 40 is located between two sidewalls 22, 26 of the rear frame 20. In an embodiment, the backlight unit 10 of the display device 1 includes two light emitting diode ("LED") substrates 60A, 60B. The LED substrates 60A, 60B are omitted in FIG. 1 for simplicity. The LED substrates 60A, 60B each include a plurality of LEDs 62A, 62B (most of the LEDs are obscured in FIG. 2). As shown in FIG. 2, a first LED substrate 60A is located between a first sidewall 22 and the light guide plate 40. In an embodiment, the first LED substrate 60A is attached to the rear frame 20.

The light guide plate 40 has a front 44 and a rear 46. The front 44 of the light guide plate 40 faces towards the LCD panel 4. The LED substrates 60A, 60B are arranged along sides 48, 52 of the light guide plate 40. The light guide plate 40 is configured to supply to light $L_2$ to the LCD panel 4. The LEDs 62A, B are configured to supply light $L_1$ to the sides 48, 52 of the light guide plate 40. The light guide plate 40 is configured such that the light $L_1$ enters through its side(s) 48, 52, is guided inside the light guide plate 40, and is then emitted from a front 44 of the light guide plate 40 with a general light evenness. The light $L_1$ is redirected out through the front 44 of the light guide plate 40. In an embodiment, at least some of the light $L_1$ is redirected by about 90 degrees inside the light guide plate 40.

In an embodiment, the reflective sheet 42 extends along the rear 46 of the light guide plate 40. The reflective sheet 42 is located between the rear 46 of the light guide plate 40 and the rear wall 30 of the rear frame 20. In an embodiment, the reflective sheet 42 can be a layer formed on the rear 46 of the light guide plate 40.

In an embodiment, the display device 1 also includes a controller 90 that supplies power to the LEDs 62A, 62B. The controller 90 includes a cable 92 that electrically connects to the LED substrate 60A for at least providing power to the LEDs 62A of the LED substrate 60A. An end 94 of the cable 92 connects to the LED substrate 60A. The controller 90 and the electrical connection between the controller 90 and LED substrate 60A are discussed in more detail below.

In an embodiment, the display panel 4 may also include a rear cover 80 that extends along the rear frame 20 and covers the back of the rear frame 20. In an embodiment, the controller 90 may be located between the rear frame 20 and the rear cover 80.

Figure 3:
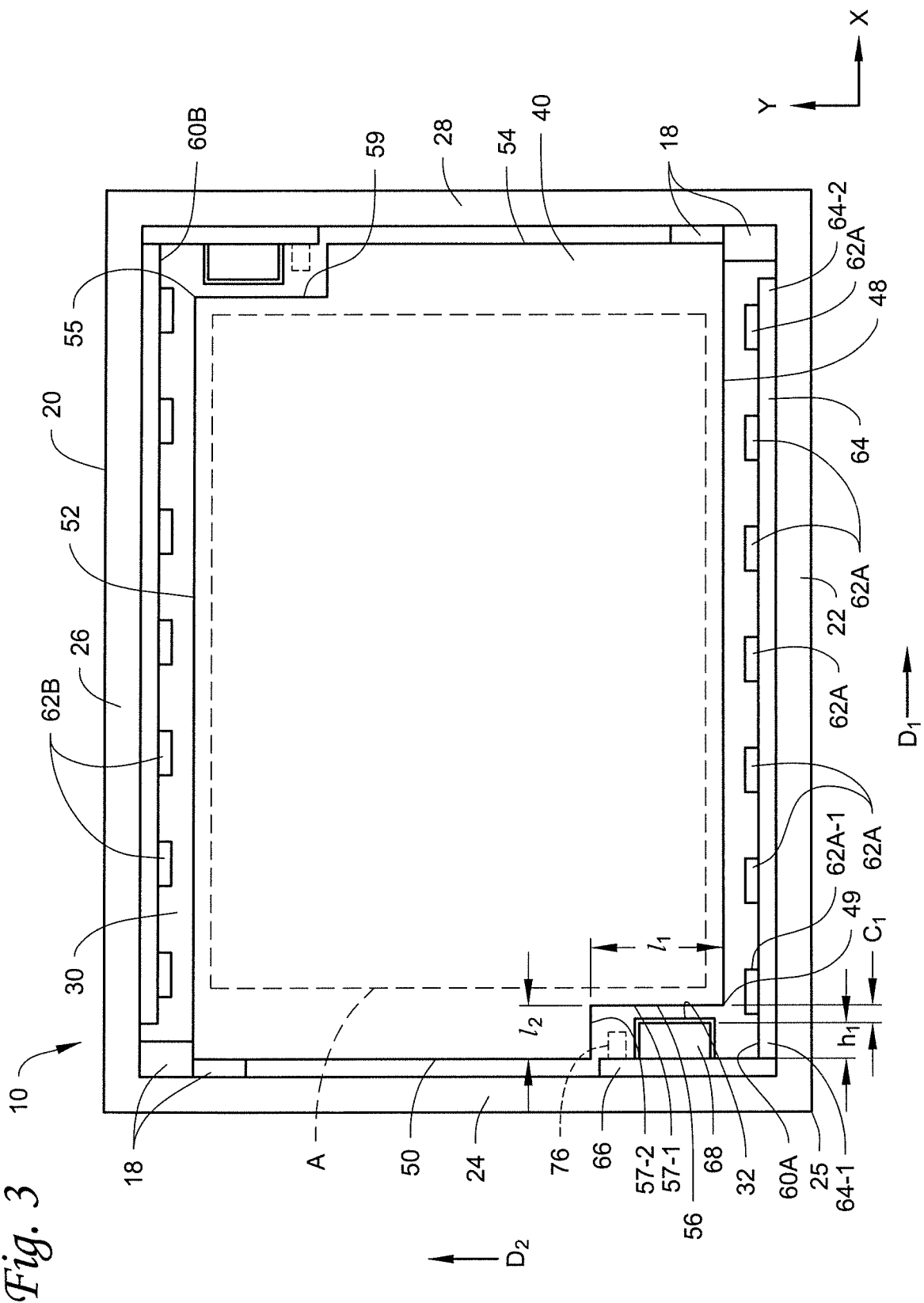
FIG. 3 is a schematic view of the backlight unit in the display device of FIG. 1, according to an embodiment.

FIG. 3 is a schematic of the backlight unit 10 of the display device 1 in plan view, according to an embodiment. The backlight unit 10 includes the rear frame 20, the LED substrate 60A, and the light guide plate 40. In an embodiment, the rear frame 20 includes a first sidewall 22, a second sidewall 24, a third sidewall 26, and a fourth sidewall 28, and a rear wall 30.

The light guide plate 40 is arranged between the sidewalls 22, 24, 26, 28 of the rear frame 20. In FIG. 3, the sidewalls 22, 24, 26, 28 of the rear frame 20 are continuous. However, the sidewalls 22, 24, 26, 28 may not be entirely continuous in an embodiment. In an embodiment, one or more cushions 18 are utilized to position the light guide plate 40 between the sidewalls 22, 24, 26, 28 of the rear frame 20. In an embodiment, the rear frame 20 may be formed to contact side(s) of the light guide plate 40 to position the light guide plate 40.

The light guide plate 40 includes a first side 48 that faces the first sidewall 22 and a second side 50 that faces the second sidewall 24. The LED substrate 60A extends around a corner 49 of the light guide plate 40 formed by the first side 48 and the second side 50 of the light guide plate 40. In an embodiment, the LED substrate 60A is located at a corner 25 of the rear frame 20 formed by the first sidewall 22 and the second sidewall 24 of the rear frame 20.

The LED substrate 60A includes a plurality of LEDs 62A, a first substrate portion 64, a second substrate portion 66, and a power connector 68. The LED substrate 60A is attached to the rear frame 20. In FIG. 3, the first substrate portion 64 is attached to the first sidewall 22 and the second substrate portion 66 is attached to the second sidewall 24. However, only one of the first and second substrate portions 64, 66 may be attached to its respective sidewall 22, 24 in an embodiment. For example, the LED substrate 60A can be attached to the rear frame 20 by adhesive(s), screw(s), pin(s), etc.

The LEDs 62A are mounted onto the first substrate portion 64 of the LED substrate 60A. The power connector 68 is mounted onto the second substrate portion 66 of the LED substrate 60A. The power connector 68 faces towards an opening 32 in the rear wall 30 of the rear frame 20. Most of the opening 32 is obscured in FIG. 3. The configuration of the power connector 68 and the opening 32 are discussed in more detail below.

The first substrate portion 64 extends in a first direction $D_1$ along the first side 48 of the light guide plate 40. The first substrate portion 64 is located between the first side 48 of the light guide plate 40 and the first sidewall 22 of the rear frame 20. The LEDs 62A are located between the first substrate portion 64 and the light guide plate 40.

FIG. 3 shows seven LEDs 62A mounted on the first substrate portion 64 for illustration purposes. However, it should be understood that the LED substrate 60A in an embodiment may have a different number of LEDs 62A mounted onto the first substrate portion 64. In an embodiment, five or more LEDs 62A are mounted onto the first substrate portion 64.

The second substrate portion 66 extends in a second direction $D_2$ along the second side 50 of the light guide plate 40. The second direction $D_2$ is different from the first direction $D_1$. The second substrate portion 66 is located between the second side 50 of the light guide plate 40 and the second sidewall 24 of the rear frame 20. The power connector 68 is electrically connected to the LEDs 62A via the first and second substrate portions 64, 66. The power connector 68 is configured to supply power to the LEDs 62A. The configuration of the power connector 68 is described in more detail below.

In an embodiment, the first substrate portion 64 includes a first end 64-1 and a second end 64-2. The first end 64-1 and the second end 64-2 being opposite ends of the first substrate portion 64 in the first direction $D_1$. The second substrate 66 extends from the first end 64-1 of the first substrate portion 64 in the second direction $D_2$. In an embodiment, the second substrate portion 66 is directly connected to the first substrate portion 64.

The light guide plate 40 includes a notch 56. In an embodiment, the notch 56 is in both the first side 48 and the second side 50 of the light guide plate 40. As shown in FIG. 3, the power connector 68 is disposed in the notch 56. In an embodiment, the notch 56 provides additional space for accommodating the power connector 68. Dashed lines indicate the location of the display area A in the thickness direction of the display device 1 (i.e., in the thickness direction $D_t$ in FIG. 2) in FIG. 3. As shown in FIG. 3, the notch 56 is located outside of the display area A in the thickness direction. The notch 56 is configured to not overlap with the display area A of the display device 1 in the thickness direction. For example, the notch 56 can be located behind the front frame 2 and/or the middle frame 6 (shown in FIGS. 2 and 3) in the thickness direction of the display device 1.

The notch 56 has a first surface 57-1 and a second surface 57-2. As shown in FIG. 3, the first surface 57-1 and second surface 57-2 form the notch 56. The first surface 57-1 extends away from the first substrate portion 64 and generally extends in the same direction as the second substrate portion 66 (e.g., in direction $D_2$). The second surface 57-2 extends away from the second substrate portion 66 and generally extends in the same direction as the first substrate portion 64 (e.g., in direction $D_1$).

The length $l_1$ of the first surface 57-1 is longer than the length $l_2$ of the second surface 57-2 (i.e., $l_1 > l_2$). The notch 56 is longer in the second direction $D_2$ than in the first direction $D_1$. In an embodiment, the clearance $C_1$ between the first surface 57-1 and the power connector 68 is less than 1 mm (i.e., $C_1 < 1$ mm). In an embodiment, the clearance $C_1$ is equal to or less than 20% of the height $h_1$ of the power connector 68 (i.e., $C_1 \leq 0.2\, h_1$).

The LEDs 62A include an end LED 62A-1. The end LED 62A-1 is the LED 62A that is closest to the second substrate portion 66. In an embodiment, the end LED 62A-1 is configured to have a luminous flux that is at or about 1.3 to at or about 2.0 of the average luminous flux of the other LEDs 62A. The average luminous flux is an average of the luminous fluxes of each of the other LEDs 62A except for the end LED 62A-1. In an embodiment, the controller 90 is configured to supply a higher current to the end LED 62A-1 relative to an average current supplied to the other LEDs 62A to achieve the desired luminous flux. In an embodiment, the controller 90 may be configured to supply at or about 1.3 to at or about 2.0 of the average current supplied to each of the other LEDs 62A on the first substrate portion 64. In an embodiment, the end LED 62A-1 is configured to have a larger size so that the end LED 62A-1 achieves the desired luminous flux. The higher luminous flux of the end LED 62A-1 can advantageously offset any dark spot caused by including the notch 56 in the light guide plate 40.

In an embodiment, the LED substrate 60A can include a supplementary LED 76. The supplementary LED 76 is mounted onto the second substrate portion 66 such that the power connector 68 is located between the supplementary LED 76 and the first substrate portion 64. In an embodiment, the supplementary LED 76 is disposed in the notch 56 of the light guide plate 40.

The supplementary LED 76 is configured to supply light to the light guide plate 40 to offset any dark spot caused by including the notch 56 in the light guide plate 40. In an embodiment, the supplementary LED 76 is configured to have a luminous flux that is about or less than 0.5 of the average luminous flux of the LEDs 62A. In an embodiment, the supplementary LED 76 has a luminous flux that is about or less than 0.5 of the luminous flux of one of the LEDs 62A. In an embodiment, the controller 90 is configured to supply a current to the supplementary LED 76 that is about or less than 0.5 of the average current supplied to each of the LEDs 62A.

In an embodiment, the light guide plate 40 also includes a third side 52 that faces the third sidewall 26 and a fourth side 54 that faces the fourth sidewall 28. As shown in FIG. 3, the backlight unit 10 includes the second LED substrate 60B. In an embodiment, the second LED substrate 60B may independently have a structure as similarly discussed above for the first LED substrate 60A, except for being located along the third side 52 and the fourth side 54 of the light guide plate 40. In an embodiment, the second LED substrate 60B is located at a second corner 55 of the light guide plate 40 formed by the third side 52 and the fourth side 54 of the light guide plate 40. In such an embodiment, the second corner 55 is opposite to the first corner 49 for the first LED substrate 60A. The light guide plate 40 includes the notch 59 for the second LED substrate 60B. The notch 59 may independently have a structure as similarly discussed above for the notch 59 for the first LED substrate 60A. In an embodiment, the backlight unit 10 may include a single LED substrate 60A, 60B.

Figure 4:
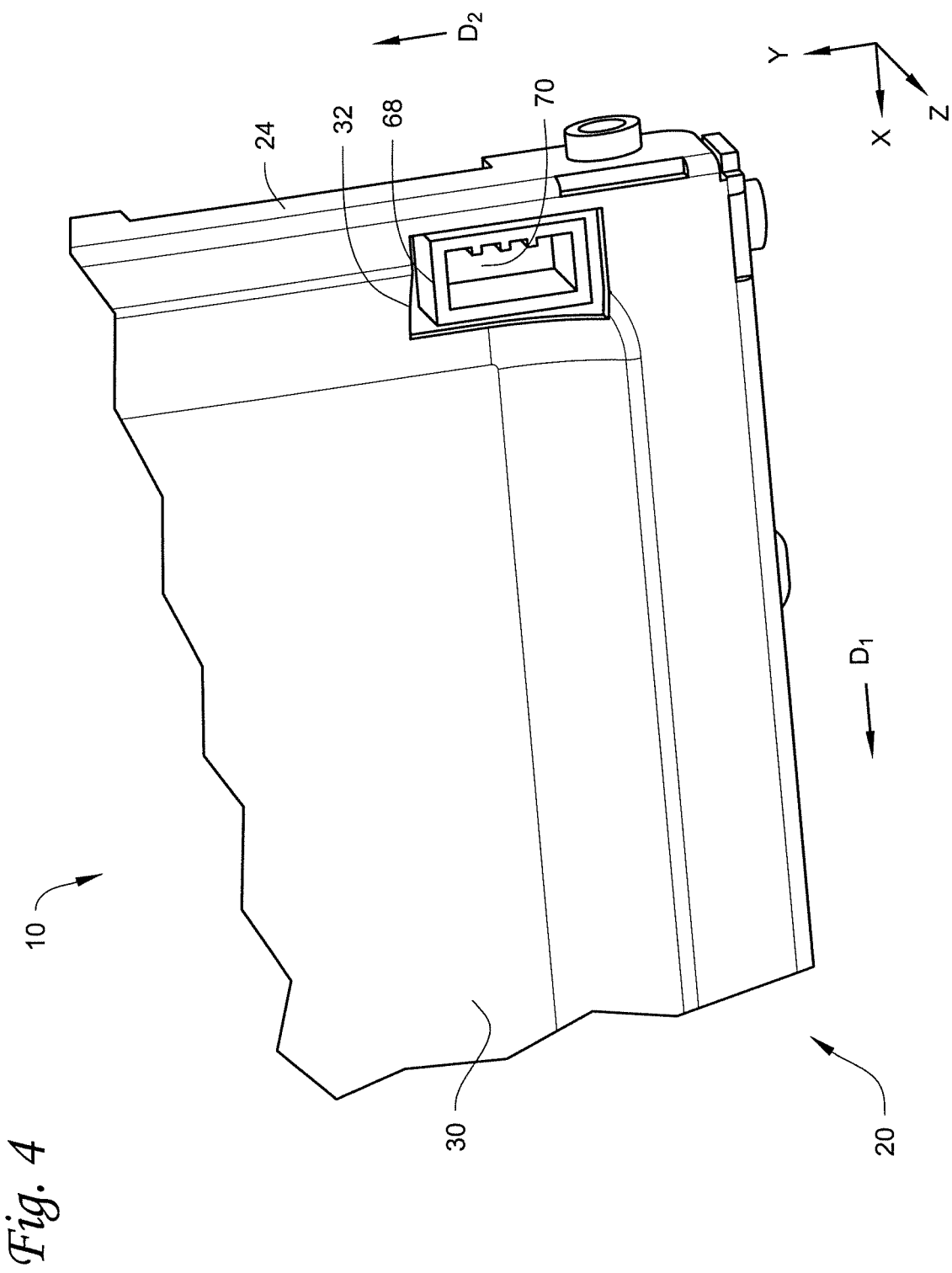
FIG. 4 is a partial rear prospective view of the backlight unit in FIG. 3, according to an embodiment.

FIG. 4 is a partial rear perspective view of the backlight unit 10 of the display device 1, according to an embodiment. The rear frame 20 includes the rear wall 30 with the opening 32 for the power connector 68. In an embodiment, the cable 92 plugs into the power connector 68. As shown in FIG. 4, the power connector 68 includes a socket 70. The socket 70 is configured to receive the end 94 of the cable 92 (shown in FIG. 2). The socket 70 faces in a rearward direction (e.g., direction $D_t$ in FIG. 2). The rearward direction is a third direction that is perpendicular to the first direction $D_1$ (shown in FIG. 3) and the second direction $D_2$ (shown in FIG. 3). In an embodiment, the socket 70 faces towards the rear cover 80 of the display device 1.

Plugging the cable 92 into the power connector 68 electrically connects the cable 92 and the power connector 68. In an embodiment, the cable 92 is plugged into the power connector 68 by having an end 94 (shown in FIG. 2) that is inserted into the power connector 68. For example, the end 94 of the cable 92 is inserted into the socket 70 of the power connector 68. In an embodiment, the end 94 of the cable 92 is a plug with a shape that generally matches the shape of the socket 70. In an embodiment, the controller 90 (shown in FIG. 2) may be configured to supply power to the LEDs 62 (shown in FIG. 3) via the cable 92 and the power connector 68. In an embodiment, the controller 90 may be configured to also supply power to the supplemental LED 76 (shown in FIG. 3) via the cable 92 and the power connector 68.

From the second substrate portion 66 (shown in FIG. 3), the power connector 68 extends towards the opening 32 in the rear wall 30 of the rear frame 20. As shown in FIG. 4, the power connector 68 extends through the opening 32 in the rear wall 30. However, it should be appreciated that the power connector 68 in an embodiment may not extend through the opening 32. In an embodiment, the socket 70 faces towards the opening 32 in the rear wall 30 of the rear frame 20. In such an embodiment, the wire 92 can pass through the opening 32 in the rear wall 30.

FIG. 5 is a schematic of an embodiment of a backlight unit 110 for a display device in plan view. The backlight unit 110 has a similar configuration to the backlight unit 10 in FIG. 3, except for the configuration of a notch 156 in the light guide plate 140. For example, the backlight unit 110 includes a rear frame 120 with sidewalls 122, 124, 126, 128, a rear wall 130, and an opening 132 in the rear wall 130; the light guide plate 140; a reflective layer (not shown); an LED substrate 160A including a first substrate portion 164, a second substrate portion 166, a plurality of LEDs 162A mounted onto the first substrate portion 164, and a power connector 168 mounted onto the second substrate portion 166. FIG. 5 also includes a dashed line to indicate the location of a display area A of the display in the thickness direction of the display device, similar to FIG. 3.

The backlight unit 110 in FIG. 5 has two LED substrates 160A, 160B. However, it should be appreciated that the backlight unit 110 in an embodiment may have a single LED substrate 160A, 160B.

In an embodiment, the LED substrate 160A may include a supplemental LED 176 with a similar configuration as discussed above for the supplemental LED 76 in the backlight unit 10. In an embodiment, an end LED 162A-1 may have a configuration as similarly discussed above regarding the end LED 62A-1 in the backlight unit 10. In an embodiment, the backlight unit 110 may include one or more cushions 118 that are utilized to position the light guide plate 140 in the rear frame 120.

The light guide plate 140 includes a first side 148, a second side 150, a third side 152, and a fourth side 154. The first side 148 faces the first sidewall 122 of the rear frame 120 and the second side 150 faces the second sidewall 124 of the rear frame 120. The third side 152 faces the third sidewall 126 of the rear frame 120 and the fourth side 154 faces the fourth sidewall 128 of the rear frame 120.

As shown in FIG. 5, the first substrate portion 164 is located between the first side 148 of the light guide plate 140 and the first sidewall 122 of the rear frame 120. The second substrate portion 166 is located between the second side 150 of the light guide plate 140 and the second sidewall 124 of the rear frame 120. In an embodiment, the LED substrate 160A is located at a corner 149 of the light guide plate 140. The corner 149 formed by the first side 148 and the second side 150 of the light guide plate 140.

The light guide plate 140 includes a notch 156 formed in the second side 150. The power connector 168 is disposed in the notch 156. In an embodiment, the power connector 168 extends towards the opening 132 as similarly discussed above with respect to the power connector 68 in FIGS. 3 and 4. As shown in FIG. 5, the notch 156 is configured to be located outside of the display area A of the display device in the thickness direction of the display device. The notch 156 is configured to not overlap with the display area A in the thickness direction of the display device.

As show in FIG. 5, the notch 156 is formed in just a single side 150 of the light guide plate 140. A section 158 of the light guide plate 140 separates the notch 156 from the first side 148. The notch 156 has a first surface 157-1, a second surface 157-2, and a third surface 157-3.

As shown in FIG. 3, the first surface 157-1, the second surface 157-2, and the third surface 157-3 form the notch 156. The section 158 of the light guide plate 140 provides the third surface 157-3. The first surface 157-1 extends away from the first substrate portion 164 and generally extends in the same direction as the second substrate portion 66 (e.g., in direction $D_2$). The second surface 157-2 and the third surface 157-2 each extend away from the second substrate portion 166 and generally extend in the same direction as the first substrate portion 164 (e.g., in direction $D_1$).

The first surface 157-1 has length $l_3$ that is longer than either the length $l_4$ of the second surface 157-2 or the length $l_5$ of the third surface 157-3 (i.e., $l_3 > l_4$ and $l_3 > l_5$). The notch 156 is longer in the second direction $D_2$ than in the first direction $D_1$. In an embodiment, the clearance $C_2$ between the first surface 157-1 and the power connector 168 is less than 1 mm (i.e., $C_2 < 1$ mm). In an embodiment, the clearance $C_2$ is equal to or less than 20% of the height $h_2$ of the power connector 168 (i.e., $C_2 \leq 0.2\ h_2$).

The length $l_5$ of the section 158 of the light guide plate 140 is shorter than the height $h_2$ of the power connector 168 (i.e., $l_5 \leq 0.5\ h_2$). In an embodiment, the length $l_5$ of the section 158 is equal to or less than 50% of the height $h_2$ of the power connector 168 (i.e., $l_5 \leq 0.5\ h_2$). In the backlight unit 110, the power connector 168 is inserted into the notch 156 to correctly arrange the light guide plate 140 in rear frame 120. As shown in FIG. 5, the power connector 168 is bounded by the light guide plate 140 in three directions in plan view (e.g., positive Y direction, negative Y direction, negative X direction).

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A display device comprising:
    a liquid crystal display (LCD) panel;
    a rear frame including a first sidewall and a second sidewall,
    a light guide plate including a front facing the LCD panel, a rear, a first side facing the first sidewall, and a second side facing the second sidewall; and
    a light emitting diode (LED) substrate including:
        a first substrate portion extending in a first direction along the first side of the light guide plate,
        a plurality of LEDs mounted onto the first substrate portion, the plurality of LEDs configured to supply light to the first side of the light guide plate that is redirected out through the front of the light guide plate towards the LCD panel,
        a second substrate portion extending in a second direction along the second side of the light guide plate, and
        a power connector mounted onto the second substrate portion and electrically connected to the plurality of LEDs for supplying power to the plurality of LEDs, wherein the rear frame includes a rear wall with an opening, the light guide plate located between the rear wall and the LCD panel in a thickness direction of the display device, and at least one of:

(a) the power connector includes a socket facing in a third direction towards the opening in the rear frame, and (b) the power connector extends through the opening in the rear frame in the third direction.

2. The display device of claim 1, wherein in plan view, the first substrate portion is located between the first side of the light guide plate and the first sidewall of the rear frame, and in the plan view, the second substrate portion is located between the second side of the light guide plate and the second sidewall of the rear frame.

3. The display device of claim 1, wherein the first substrate portion includes a first end and a second end opposite the first end in the first direction, and the second substrate portion extends from the first end of the first substrate portion in the second direction.

4. The display device of claim 1, wherein the third direction is perpendicular to both the first direction and the second direction.

5. The display device of claim 1, further comprising:

a controller; and a cable electrically connected to the controller and plugged into the power connector, wherein the plurality of LEDs includes an end LED located closest to the second substrate portion, the controller configured to supply a current to the end LED that is at or about 1.3 to at or about 2.0 of an average current supplied to each of the other LEDs in the plurality of LEDs.

6. The display device of claim 1, wherein the LED substrate includes a supplemental LED mounted onto the second substrate portion, and in plan view, the power connector is located between the supplemental LED and the first substrate portion.

7. The display device of claim 6, further comprising:

a controller; and a cable electrically connected to the controller and plugged into the power connector, wherein the supplemental LED is electrically connected to the power connector, and the controller configured to supply a current to the supplemental LED that is at or about or less than 0.5 of an average current supplied to each LED in the plurality of LEDs.

8. The display device of claim 1, further comprising:

a display surface with a display area, wherein the light guide plate includes a notch in at least one of the first side and the second side, the power connector being disposed in the notch in plan view, and the notch being located outside of the display area in a thickness direction of the display device.

9. A display device comprising:

a liquid crystal display (LCD) panel;

a rear frame including a first sidewall and a second sidewall, a light guide plate including a front facing the LCD panel, a rear, a first side facing the first sidewall, and a second side facing the second sidewall;

a light emitting diode (LED) substrate including:

a first substrate portion extending in a first direction along the first side of the light guide plate, a plurality of LEDs mounted onto the first substrate portion, the plurality of LEDs configured to supply light to the first side of the light guide plate that is redirected out through the front of the light guide plate towards the LCD panel, a second substrate portion extending in a second direction along the second side of the light guide plate, and a power connector mounted onto the second substrate portion and electrically connected to the plurality of LEDs for supplying power to the plurality of LEDs;

a controller; and a cable electrically connected to the controller and plugged into the power connector, wherein the plurality of LEDs includes an end LED located closest to the second substrate portion, the controller configured to supply a current to the end LED that is at or about 1.3 to at or about 2.0 of an average current supplied to each of the other LEDs in the plurality of LEDs.

10. A display device comprising:

a liquid crystal display (LCD) panel;

a rear frame including a first sidewall and a second sidewall, a light guide plate including a front facing the LCD panel, a rear, a first side facing the first sidewall, and a second side facing the second sidewall;

a light emitting diode (LED) substrate including:

a first substrate portion extending in a first direction along the first side of the light guide plate, a plurality of LEDs mounted onto the first substrate portion, the plurality of LEDs configured to supply light to the first side of the light guide plate that is redirected out through the front of the light guide plate towards the LCD panel, a second substrate portion extending in a second direction along the second side of the light guide plate, and a power connector mounted onto the second substrate portion and electrically connected to the plurality of LEDs for supplying power to the plurality of LEDs;

a controller; and a cable electrically connected to the controller and plugged into the power connector, wherein the LED substrate includes a supplemental LED mounted onto the second substrate portion, in plan view, the power connector is located between the supplemental LED and the first substrate portion, and the supplemental LED is electrically connected to the power connector, and the controller configured to supply a current to the supplemental LED that is at or about or less than 0.5 of an average current supplied to each LED in the plurality of LEDs.

* * * * *